United States Patent [19]

Geisow

[11] 4,436,280

[45] Mar. 13, 1984

[54] VALVE ACTUATOR MECHANISM FOR LIFT-TURN TYPE VALVES

[75] Inventor: Bernard H. Geisow, Houston, Tex.

[73] Assignee: Daniel Industries, Inc., Houston, Tex.

[21] Appl. No.: 429,300

[22] Filed: Sep. 30, 1982

[51] Int. Cl.³ .................. F16K 31/50; F16K 31/52; F16K 31/54

[52] U.S. Cl. .................. 251/229; 74/22 R; 74/23; 74/25; 74/57; 74/422; 251/14; 251/56; 251/58; 251/250; 251/252

[58] Field of Search ............... 74/22, 23, 25, 57, 422, 74/424.8 VA; 251/14, 56, 58, 229, 250, 251, 252

[56] References Cited

U.S. PATENT DOCUMENTS

| | | | |
|---|---|---|---|
| 2,238,814 | 4/1941 | Kneass, Jr. .................. | 251/56 |
| 2,949,789 | 8/1960 | Eminger ...................... | 74/23 |
| 2,953,344 | 9/1960 | Yancey ....................... | 251/58 |
| 3,046,802 | 7/1962 | Cupedo ....................... | 251/62 |
| 3,793,893 | 2/1974 | Heinen ........................ | 251/229 |
| 3,806,082 | 4/1974 | Kellner ....................... | 251/58 |
| 3,941,348 | 3/1976 | Mott ........................... | 251/58 |
| 4,120,479 | 10/1978 | Thompson et al. ........... | 251/56 |
| 4,234,157 | 11/1980 | Hodgeman et al. .......... | 251/56 |
| 4,293,117 | 10/1981 | Mueller ....................... | 251/252 |
| 4,350,322 | 9/1982 | Mueller ....................... | 251/229 |

Primary Examiner—George L. Walton
Attorney, Agent, or Firm—Gunn, Lee & Jackson

[57] ABSTRACT

A valve actuator mechanism for a lift-turn type valve having a valve element that is operated by first linear unseating movement, rotational repositioning movement and linear reseating movement. First and second actuator stems are supported by an actuator housing for both linear and rotational movement. A movement translation mechanism is interconnected between the first and second actuator stems and functions to translate an initial component of linear movement of the second actuator stem in one direction into an initial component of movement of the first actuator stem in said one direction to unseat said valve element, translating an intermediate component of linear and rotary movement of said second actuator stem in said one direction into an intermediate rotary movement of said first actuator stem to rotate and reposition said valve element and translating a terminal component of linear movement of said second actuator stem in said one direction into a terminal linear component of movement of said first actuator stem in an opposite direction to reseat said valve element.

23 Claims, 9 Drawing Figures

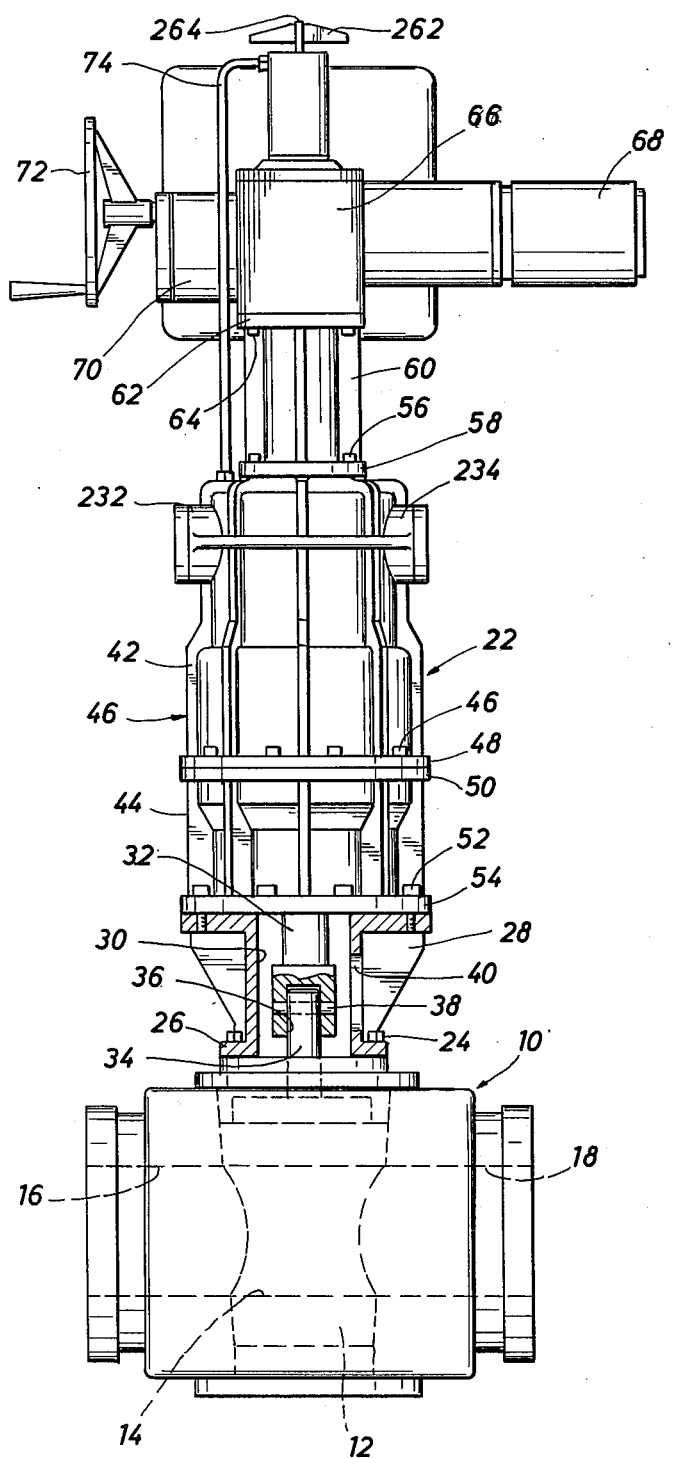
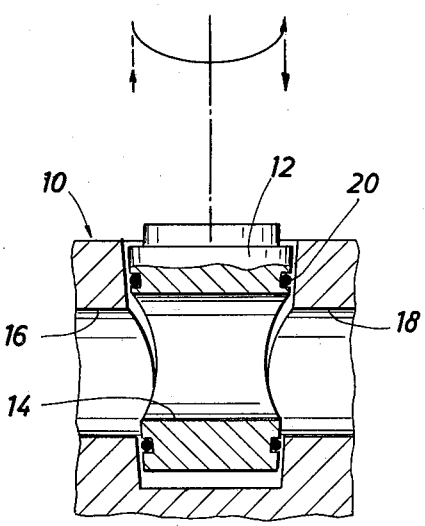
FIG. 1
FIG. 2

VALVE ACTUATOR MECHANISM FOR LIFT-TURN TYPE VALVES

FIELD OF THE INVENTION

This invention relates generally to valve actuators for rotary plug valves and, in particular, actuators for four-way plug valves that control the flow of fluid in a flow conduit system. More particularly, the present invention relates to an actuator system for lift plug type plug valve mechanisms wherein the plug element and valve chamber of the valve are of frusto-conical mating configuration and the plug element is operated by a linear unseating movement, a rotational movement to reposition the plug element relative to the flow conduit system and an opposite linear reseating movement for reseating the plug element relative to the seating surfaces defined by the valve chamber.

BACKGROUND OF THE INVENTION

It will be apparent from the following disclosure that the present invention has particular utility in conjunction with four-way type lift-plug valves. It should be borne in mind, however, that the present invention also has utility from the standpoint of rotary lift-plug valves other than four-way plug valves. For purposes of simplicity, however, the invention is described particularly as it relates to four-way plug valve mechanisms, such as may be incorporated into bidirectional meter prover systems.

Plug valves may be classified in three basic groups, i. e. cylindrical plug valves, tapered or conical plug valves and spherical plug valves. Spherical plug valves are commonly referred to as ball valves and are simply rotated 90° to establish the open and closed positions of the valve. Cylindrical plug valves are also opened and closed by simple rotational movement. With regard specifically to tapered plug valves, these may be classified as simple rotary valves, wherein the plug element is simply rotated within the valve body for controlling the flow of movement through the valve mechanism or lift-plug valves wherein the valve element is moved linearly as well as rotated during an operational movement. The present invention specifically concerns valve actuator systems for lift-plug type plug valves.

In order to protect the sealing elements and sealing surfaces of tapered plug valves from excessive wear, lift-plug valves have been developed that are operated by lifting the tapered plug element or shifting it linearly to unseat or separate the sealing element of the plug from the seating surfaces defined within the valve body. After the unseating movement, the plug element is then rotated to the proper position and is then moved linearly in the opposite direction to again seat the sealing element of the plug in sealing engagement with the seating surfaces of the valve body. As the plug element is rotated during operation of the valve mechanism, the sealing element often carried by the plug is not in engagement with any internal seating surfaces and therefore no wear occurs during such movement. The service life of lift-turn type plug valves is therefore materially enhanced by preventing the wear that would otherwise occur during operation. Providing a lift-turn capability for plug valve mechanisms is especially important when large plug valves are employed because of the distance of seal travel that occurs during operational movements.

When four-way type lift plug valve mechanisms are incorporated in meter prover systems, it is necessary for such valve mechanisms to be cycled quite frequently at rapid rates of rotation. It is therefore desirable to provide a plug valve mechanism that does not become excessively worn as the result of rapid, frequent cycling.

In four-way plug valves, the rotary valve element defines a vein like fluid blocking structure that is surrounded by a sealing portion that engages sealing surfaces defined within the valve body. As the rotary valve element is moved between its open and closed positions, at certain positions flowing fluid impinges on the vein like fluid blocking structure and develops a force that tends to rotate the valve element either in the direction of movement by the valve actuator or in a direction opposing the valve actuator. This force development phenomenon is typically referred to as "windmilling" where ham systems are employed for achieving rotation of the valve element within the valve body the forces that develop windmilling phenomenon are applied through connection structure to the valve actuator mechanism. In some cases, the valve actuator camming structure allows a certain amount of lost motion to occur during certain phases of the valve actuation movement. Windmilling forces can cause inadvertent movement of the valve element during such lost motion phases of valve actuation and can cause the rotating valve mechanism to move suddenly because of the valve actuator freedom that is allowed by the lost motion phase of valve actuation. When this occurs, the rotating valve will apply slamming forces to the valve actuator mechanism, thereby causing damage to or excessive wear of the valve actuator parts. It is desirable to provide a valve actuator mechanism that is free from lost motion phenomenon, thereby preventing the development of valve slamming as the result of windmilling. It is also desirable to provide means for insuring that severe inertial forces of the rotating valve element are not transmitted to the valve actuator mechanism in such manner that the actuator mechanism becomes excessively worn or damaged during use. This will insure that the valve actuator will provide extended service life and will facilitate less expensive manufacture of the valve actuator mechanism itself.

Where lift plug type valve mechanisms are employed in conjunction with valve actuators for achieving both linear and rotational movements, it is typically necessary for the power actuation mechanism of the valve actuator to be reversed to achieve one of the opposed linear portions of the movement sequence. Stopping and reversing a valve actuator power mechanism during each cycle of operation obviously develops an adverse condition from the standpoint of wear and serviceability. It is desirable to provide a valve actuator mechanism that includes a power mechanism operable in a single rotary or linear direction in order to achieve complete actuation of lift plug type valve mechanisms.

In view of the foregoing, it is a primary feature of the present invention to provide a novel valve actuator mechanism for lift plug type valves wherein the actuator system provides fully controlled linear and rotational movements without allowing the development of a lost motion condition.

It is a further feature of the present invention to provide a novel valve actuator mechanism for lift turn type plug valves that employs a movement translation mechanism to prevent the development of lost motion during movement between the open and closed positions thereof.

It is also a feature of the present invention to provide a novel valve actuator mechanism for lift-turn type plug valve mechanisms, such as four-way valve mechanisms, wherein a single linear movement of one actuator stem in one direction is translated into a first linear movement of a valve actuating stem, and intermediate rotational movement to reposition the valve element and a subsequent opposite linear movement to reseat the valve mechanism.

Among the several features of the present invention is contemplated a novel valve actuator mechanism for four-way lift-turn type plug valves wherein the actuator mechanism including the power actuator system therefor are filled with a protective fluid medium such as hydraulic oil and fluid interchange between the valve actuator mechanism and the power actuator mechanism is promoted by means of fluid interchange circuitry, thus allowing these mechanisms to be completely filled with the protective fluid medium.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

For the purpose of unseating, rotating, repositioning and reseating a valve element of a valve mechanism, such as a four-way valve, the valve actuator mechanism employs a housing structure within which is rotatably supported a first valve stem. The first valve stem extends from the actuator housing and is nonrotatably connectable to the valve stem of a valve element such that linear or rotational movement of the first actuator stem will cause direct linear and rotational movement of the valve stem and valve element. Within the actuator housing is also movably disposed a second actuator stem that is driven linearly by any suitable power operator system that is connectable to the actuator housing. The second actuator stem is formed to define opposed cam grooves, each cam groove having linear portions that are spaced and offset by 90° on the second actuator stem. Each of the cam grooves also includes an intermediate rotary portion that interconnects the offset linear portions thus providing an elongated groove having straight end portions and an intermediate angulated portion. Cam follower elements that are supported by the housing structure are receivable within the cam grooves and cooperate with the cam grooves during linear movement of the second actuator stem to induce 90° rotary movement to the second actuator stem.

A movement translation mechanism is also movably positioned within the housing structure and operatively interconnects the first and second actuator stems. In order to achieve quarter turn actuation of the valve mechanism in one direction, the second actuator stem is moved upwardly by the power actuator device and the movement translation mechanism causes upward movement of the first actuator stem during an initial linear component of movement. As movement of the second actuator stem is continued in an upward direction during an intermediate portion of movement of the second actuator stem including both linear and rotational components of movement, the translation mechanism induced movement of the first actuator stem solely in a rotational component. As upward movement of the second actuator stem continues through a terminal portion of its upward movement by the power actuator mechanism, the movement translation mechanism causes the first actuator stem to move downwardly, thus causing the valve stem and valve element to be moved downwardly to the reseated position thereof.

The first actuator stem is rotatably supported within the actuator housing by means of a yoke structure that is rotatably supported within the housing structure but is nonrotatably connected to the first actuator stem. At least one, and preferably a pair, of guide arm elements are rotatably supported by a pivot shaft extending between a pair of parallel arms defining a portion of the yoke structure. Each of the guide arms is provided with guide rollers or followers mounted near the extremities of the guide arms. A guide body structure is provided which is linearly movable relative to the yoke structure within limits defined by at least one elongated groove receiving the pivot shaft about which the gude arms are rotatable. The guide body structure is rotatable along with the yoke structure. The guide body structure defines at least one, and preferably a pair, of guide grooves within which the guide elements of the guide arms are received. Each of the guide grooves incorporates spaced linear portions that are interconnected by an intermediate rotatable portion. The linear portions are of relatively straight configuration, thus allowing substantially straight movement of the guide elements relative to the guide body structure as the guide body structure is being moved linearly within the actuator housing. Simultaneously, this linear movement of the guide elements coupled with linear travel of the guide body causes rotational movement of the guide arms about the pivot shaft. The guide grooves of the guide body structure also include a curved intermediate portion that is traversed by the guide elements as the guide body structure and yoke are being rotated 90° to achieve repositioning of the valve stem and valve element.

To impart driving movement to the guide arms, which is translated into both linear and rotary movement of the guide body structure and yoke, at least one, and preferably a pair, of rack gear elements are connected to the second actuator stem and are linearly and rotationally movable along with the second actuator stem. Pinion gear elements are nonrotatably connected to each of the guide arms and are engaged in driven relation with respective ones of the rack elements. As the rack elements move downwardly during a first linear component of travel, the guide arms interacting by means of the pinion gears and guide elements cause upward movement of the guide body structure relative to the yoke structure. As the rack elements continue downward movement, the rotary portion of the cam grooves of the second actuator stem induce 90° rotational movement to the guide body structure and yoke. Simultaneously, the guide arms and guide elements are rotated through an arcuate path defined by the intermediate rotational portion of the guide grooves. Continuing downward movement of the rack elements through a terminal portion of travel thereof causes downward movement of the guide body structure and the first actuating stem, connected thereto for the purpose of reseating the valve mechanism.

For operational movement of the valve mechanism in the opposite direction, a completely opposite mechanism activity will occur. While the second actuating stem is driven upwardly through a first linear component, a second rotary and linear component and a third linear component the movement translation mechanism will impart a first upward movement, a second rotary component of movement and a third downward component of movement to the first actuating stem and the valve stem and valve element connected thereto.

BRIEF DESCRIPTION OF THE DRAWINGS

So that the manner in which the above-recited features, advantages and objects of the present invention, as well as others which will become apparent, are attained and understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

In the Drawings:

FIG. 1 is an elevational view of a four-way liftturn valve having a valve actuator operatively connected thereto, which actuator is constructed in accordance with the present invention.

FIG. 2 is an operational view of the valve mechanism of FIG. 1 illustrating operation of the valve element of the valve mechanism to be accomplished by linear and rotational components of movement.

FIG. 3 is a vertical sectional view taken through the valve actuator mechanism of FIG. 1 and illustrating the internal operational components thereof in detail.

FIG. 4 is a horizontal sectional view taken along line 4—4 of FIG. 3 and illustrating further details of the internal operational components of the valve actuator mechanism.

FIG. 5 is a horizontal sectional view taken along line 5—5 of FIG. 3 and showing the connection structure between the rack elements and the second actuating stem structure.

FIG. 6 is a partial vertical section through the housing structure of the valve actuator having portions of the internal components of the valve actuator mechanism broken away and illustrated in section.

FIG. 7 is a vertical sectional view taken along line 7—7 of FIG. 6 and having portions thereof broken away so as to illustrate the relationship of the guide grooves and guide arms to the guide body structure.

FIG. 8 is a vertical sectional view through the valve actuator mechanism illustrating the relationship of the guide arms and the guide grooves during vertical movement of the second actuator stem prior to rotational movement of the second actuator stem.

FIG. 9 is an exploded view of the internal movement translation mechanism of the valve actuator with broken lines illustrating the position of the various functional parts thereof when in assembly.

DETAILED DESCRIPTION OF PREFERRED EMBODIMENT

Figure 3:
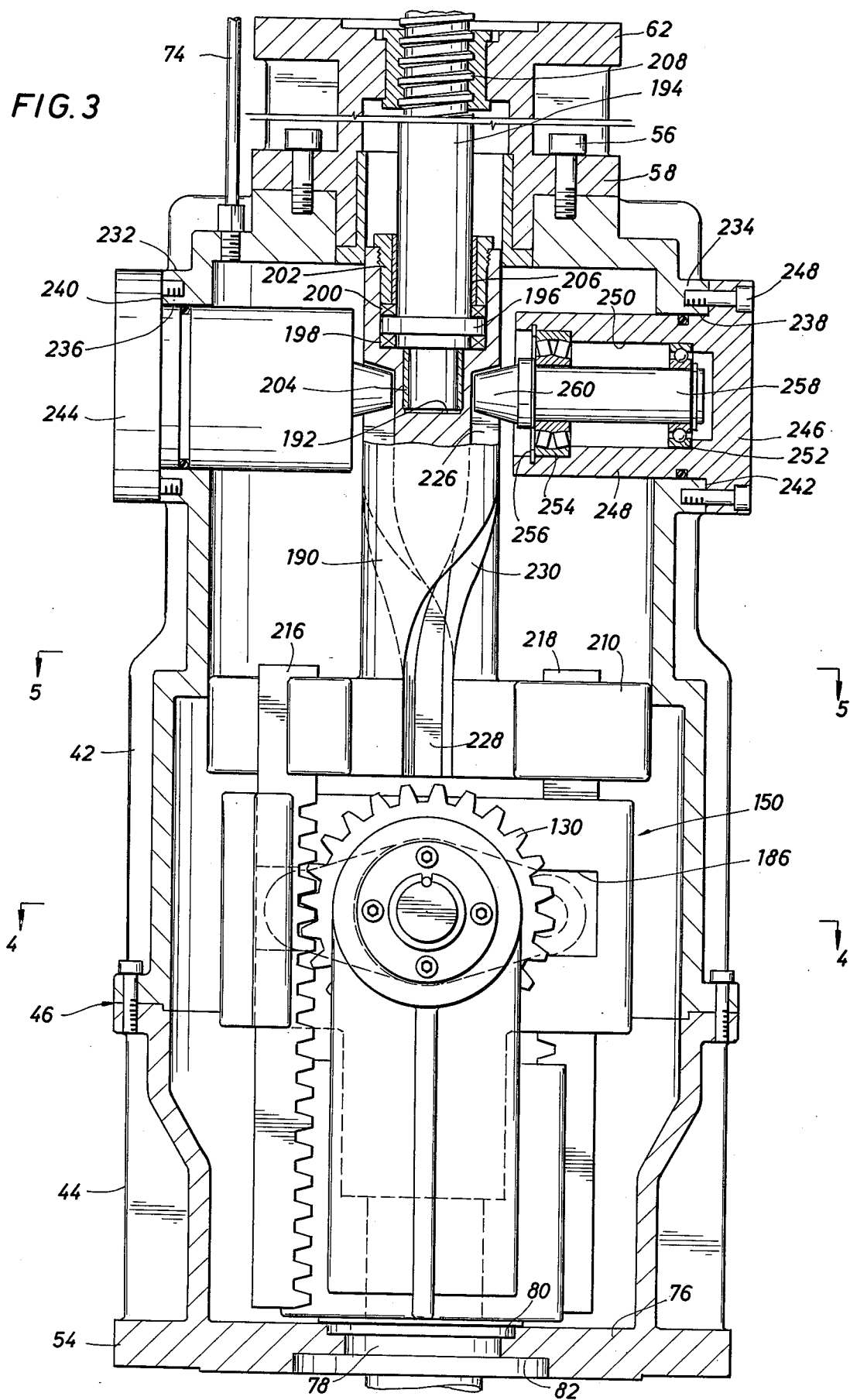

Referring now to the drawings and first to FIG. 1, a valve mechanism is illustrated generally at 10 which may be a four-way lift-turn type plug valve having a valve element that is operated by moving linearly for unseating, rotating to a desired position and then moved linearly to become reseated in sealing engagement within the valve body. As shown in broken line in FIG. 1, the valve element 12 is properly seated with its flow passage 14 aligned with inlet and outlet flow passages 16 and 18. As shown in FIG. 2, the plug member 12 is shown to be shifted linearly to the unseated position thereof, causing the sealing elements 20 to become separated from the sealing surfaces defined within the valve body. As shown diagrammatically in FIG. 2, the plug member is operated by first moving it upwardly to separate the sealing elements from the sealing surfaces. The valve element is then rotated 90° to a predetermined position and then is moved downwardly to bring the seating elements 20 into sealing engagement with other sealing surfaces defined within the valve body. Although the valve mechanism illustrated in the drawings is intended to represent a four-way type tapered plug valve, such is not intended to limit the present invention in any way. It is within the spirit and scope of the present invention to incorporate the present invention in conjunction with other valve mechanisms wherein the valve element is operated by movement having both linear and rotational components.

For the purpose of operating the valve mechanism 10, a lift-turn type valve actuator shown generally at 22 is connected to the valve mechanism by means of bolts 24 that extend through a connector flange 26 of a connector base portion 28 of the valve actuator mechanism. The connector base 28 is formed to define a tubular portion 30 through which a valve actuator stem 32 extends for the purpose of establishing nonrotatable connection with a valve stem 34 that is also receivable within the tubular stem passage portion 30. The valve actuator stem defines a receptacle 36 within which is received the free extremity of the valve stem 34. Nonrotatable connection between the valve stem and actuator stem is established by means of a connector pin 38 that extends through registering apertures formed in the valve stem and actuator stem. Obviously, any other suitable means of connection may be employed within the spirit and scope of this invention for establishing nonrotatable connection between the valve stem and actuator stem. For the purpose of gaining access to the connection between the valve stem and actuator stem, the connector base portion 28 of the valve actuator is formed to define at least one access opening 40. After the valve stem 34 has been brought into engagement within the stem receptacle 36, the connector pin 38 may be inserted through the opening 40 into received relation within the registering connector openings of the stems 32 and 34.

The valve actuator mechanism 22 is also formed to define upper and lower housing sections 42 and 44 that are joined by means of bolts 46 that extend through connector flanges 48 and 50 defined by these housing sections. The upper and lower housing sections cooperate to define an actuator housing illustrated generally at 46 that is secured to the connector base portion 28 of the actuator mechanism by means of bolts 52 that extend through a connector flange 54 defined at the lower portion of the lower housing section 44. A plurality of bolt openings are also formed at the upper portion of the upper housing section which are adapted to receive bolts 56 that extend through bolt apertures formed in a connector flange 58 defined at the lower extremity of an upper connector portion 60 of the valve actuator mechanism 22. The upper connector portion is formed to define an upper connector flange 62 through which a plurality of bolts 64 extend for the purpose of connecting a power actuator 66 to the upper portion of the valve actuator mechanism. The power actuator may be driven by means of an electric or hydaulic motor 68 or may be selectively controlled and driven by means of a manual actuator mechanism 70 that is operated by means of rotating a hand wheel 72. The power actuator 66 may take any one of a number of commercially available forms within the spirit and scope of the present invention. It is only necessary that the power actuator 66 be capable of imparting linear movement to an upper actuator stem portion of the valve actuator mechanism 22.

It may be desirable to fill the valve actuator mechanism and the power actuator with a protective fluid medium that also provides for lubrication of the various operative parts of the valve actuator and power actuator mechanisms. One such protective fluid medium may conveniently take the form of an oil, such as hydraulic oil, or any other suitable fluid lubricant. In view of the fact that fluid displacement will occur through movement of the various actuator stems and parts, a fluid interchange conduit 74 may be employed to establish fluid communication between the valve actuator mechanism 22 and the power actuator 66. This feature will allow the valve actuator and power actuator mechanisms to be completely filled with a protective fluid medium and will compensate for volumetric changes therein. Fluid displaced from the power actuator mechanism will flow through fluid interchange conduit 74 into the valve actuator housing 46 and vice versa.

Figure 6:
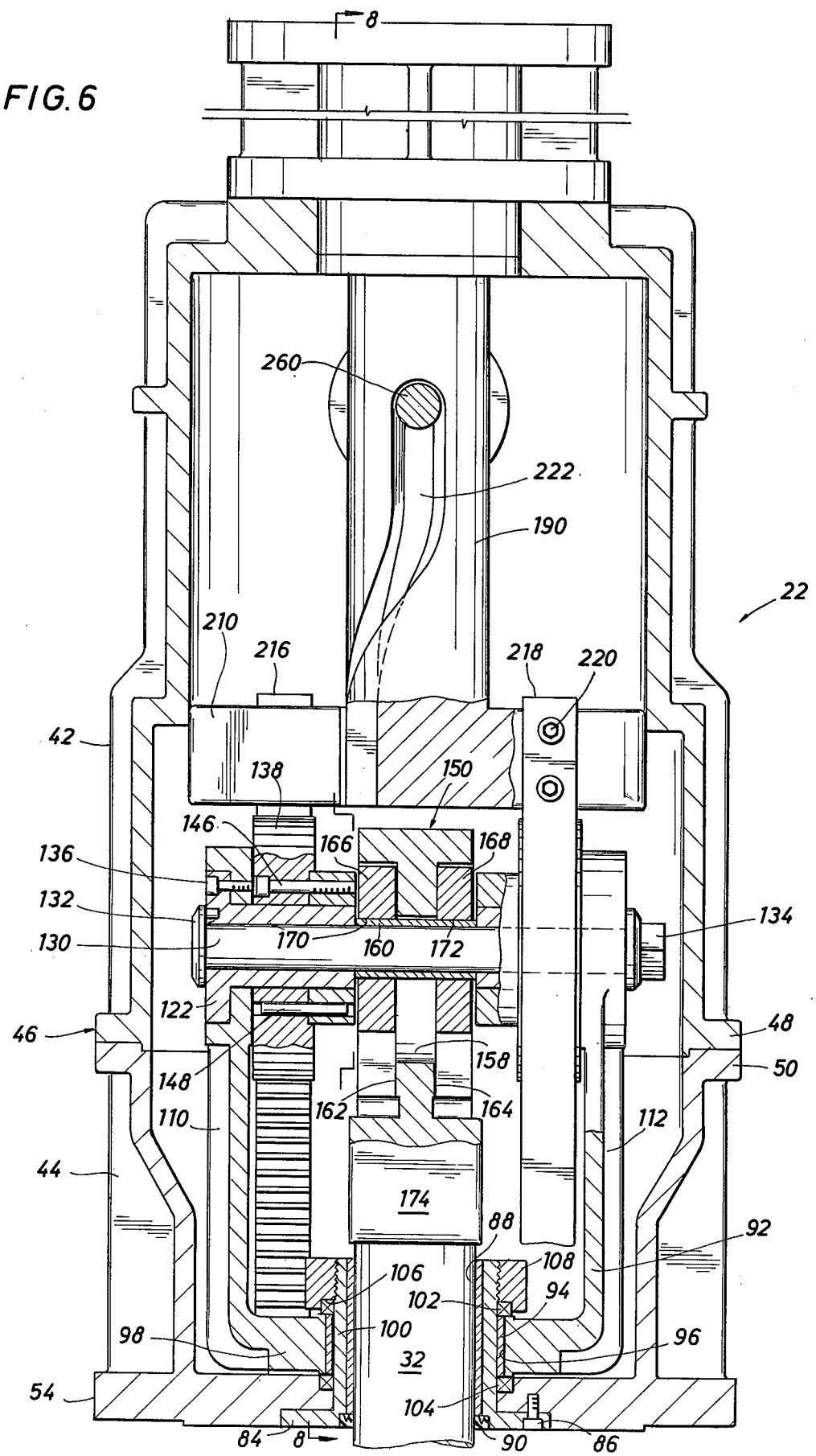
Figure 7:
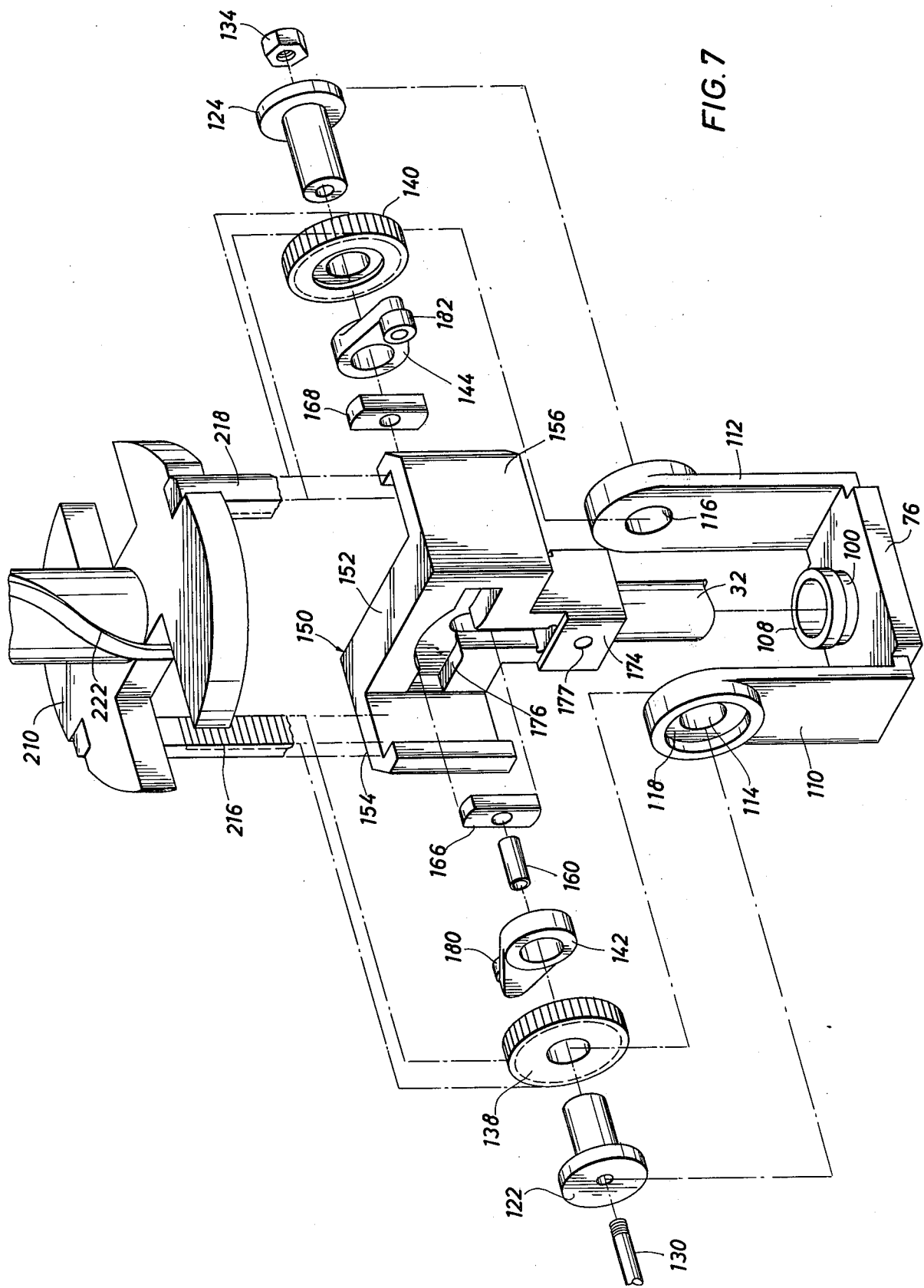

Referring now particularly to FIGS. 3-7, the structure of the valve actuator mechanism 22 will be described in detail. Referring particularly to FIG. 3, the lower housing section 44 is formed to define a generally transverse lower wall structure 76 that is contiguous with the connector flange 54 and is formed to define an actuator stem aperture 78 through which the actuator stem 32 extends. The wall structure 76 is also formed to define internal and external recesses 80 and 82, respectively, that are formed in coaxial relationship with the axis of the actuator stem passage 78. As shown in FIG. 6, a retainer element 84 is positioned within the recess 82 and is retained therein by means of a plurality of bolts 86. The retainer element provides support for an internal bushing 88 through which the valve actuator stem 32 extends. The retainer element also supports an annular sealing element 90 which provides a seal between the actuator stem 32 and retainer element 84 to prevent leakage of lubricant material along the valve actuator stem.

Within the actuator housing is rotatably positioned a yoke structure 92 having a yoke bushing 94 positioned within an aperture 96 formed in a lower wall structure 98 of the yoke. The bushing 94 is fitted closely about a cylindrical bearing portion 100 of the retainer element 84 thereby providing bearing support allowing rotary movement of the yoke 92 within the housing structure. Upper and lower thrust bearings 102 and 104 are retained about the cylindrical portion 100 of the retainer element and accommodate thrust loading between the housing structure and the rotatable yoke. Thrust bearing 104 is retained within the internal bearing recess 80 while thrust bearing 102 is retained within a bearing recess 106 defined within an annular collar 108 that is secured by threaded connection to an externally threaded upper extremity of the retainer element 84. Thus supported, the yoke structure 92 is freely rotatable within the actuator housing structure and is retained against linear movement by the bearing and retainer assembly.

The yoke structure 92 is formed to define upstanding leg elements 110 and 112 that are formed respectively to define registering apertures 114 and 116 about which are formed recesses 118 and 120. Journal elements 122 and 124 include flange portions that are received respectively within the recesses 118 and 120 and are formed to define elongated passages 126 and 128 through which a support shaft element 130 extends. The support shaft is formed at one extremity to define a head portion 132 that bears upon the journal elements 122 to retain it in position within its recess. At the opposite extremity, the support shaft 130 is formed to define a threaded portion that receives an internally threaded retainer element 134 such as a retainer nut. Each of the journal elements is retained in stationary relation with the arms 110 and 112 such as by a plurality of bolts 136 in the manner shown in FIG. 6.

Each of the journal elements 122 and 124 provides bearing support for pinion gears 138 and 140 and a pair of cam follower support elements 142 and 144 that are maintained in nonrotatable relation with one another, such as by means of bolts 146 and pins 148 that extend through registering apertures in the pinion gears and the cam follower support elements. The pinion gears and cam follower support elements are rotatable together on the journal elements to provide for both linear and rotational controlling movements of the valve actuator mechanism in the manner discussed hereinbelow.

Figure 4:
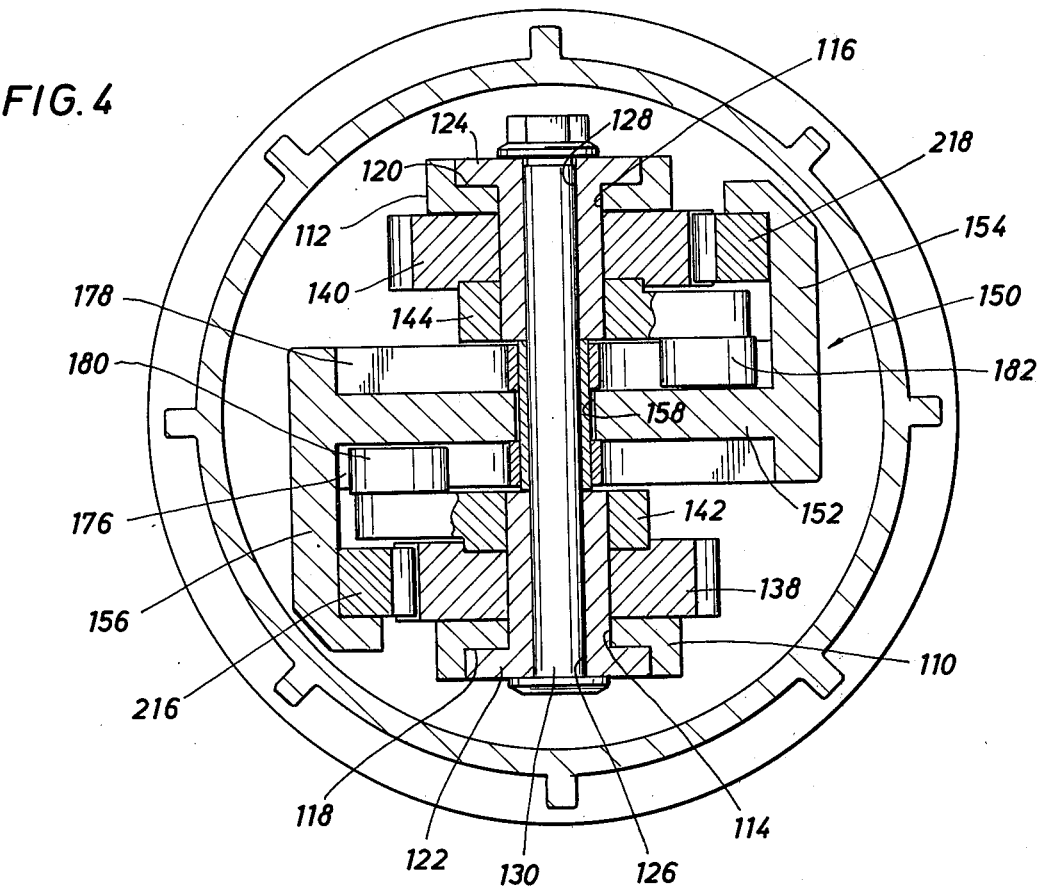
Figure 5:
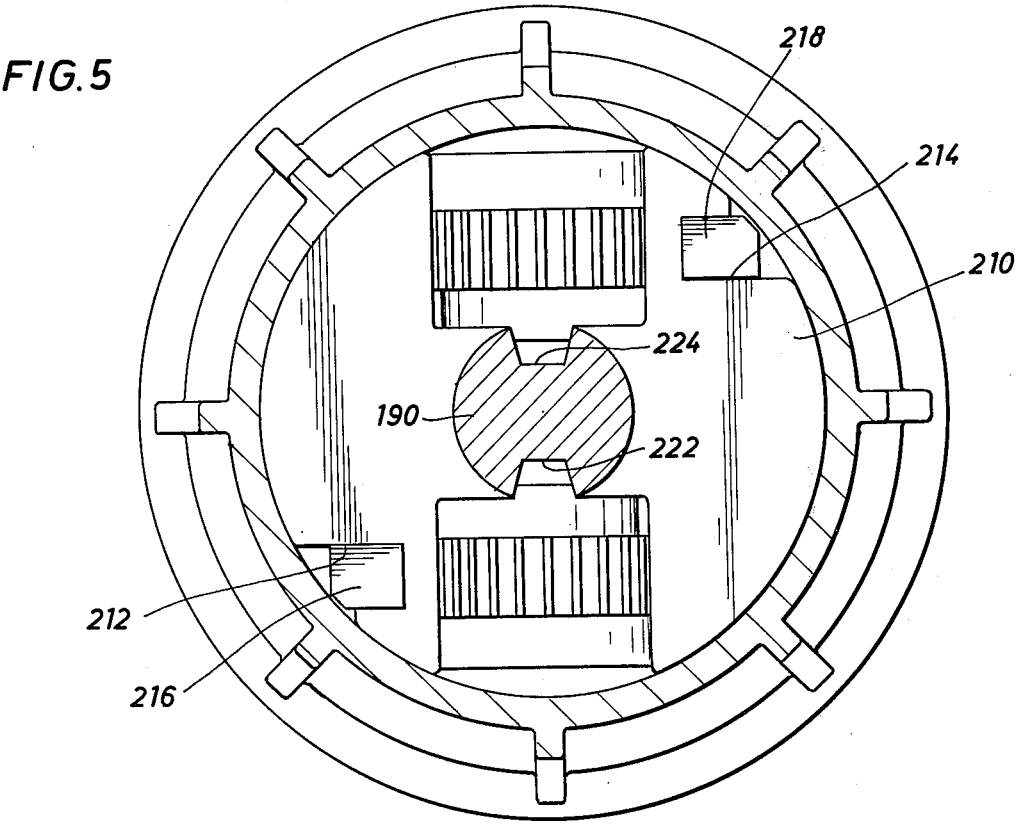

In the manner shown in FIG. 4, a guide body structure is illustrated generally at 150 which, when viewed in transverse section, defines an intermediate body portion 152 having transverse flange portions 154 and 156 formed integrally therewith. The intermediate body portion is formed to define an elongated opening 158 through which the port shaft 130 and a shaft bushing 160 extend. The elongated slot 158 allows the guide body structure 150 to move linearly with respect to the support shaft within limits defined by the length of the elongated opening 158. The intermediate body portion of the guide body is also formed to define a pair of elongated recesses 162 and 164 within which are received a pair of elongated slide elements 166 and 168, the slide elements being formed to define support apertures 170 and 172 within which are received the extremities of the shaft bushing 160. The elongated recesses 162 and 164 are of substantially greater length as compared to the slide elements 166 and 168, thereby allowing substantial linear movement of the slide elements within the respective recesses in order to accommodate relative movement between the guide body structure 150 and the support shaft and bushing structure. Slide elements 166 and 168 also cooperate to provide a nonrotatable relation between the support shaft and the guide body structure. Thus, upon rotation of the yoke element 92, the guide body structure 150 will be rotated therewith by virtue of its connection to the yoke by means of the support shaft. An actuator stem connection 174 is provided by the intermediate portion of the guide body structure and functions cooperatively with the actuator stem 32 to provide a nonrotatable relation between the guide body structure and actuator stem. A simple connector pin 176 may extend through registering apertures in the actuator stem connector and actuator stem for the purpose of establishing simple but positive connection therebetween.

As shown in FIGS. 4, 7, 8 and 9, the guide body structure is formed to define a pair of cam grooves 176 and 178 within which are received rotatable cam follower elements 180 and 182 that are rotatably supported by the cam follower support elements 142 and 144, respectively. As shown in detail in FIGS. 8 and 9, each of the cam grooves 176 and 178 is formed to define a pair of spaced linear groove portions 184 and 186 that are interconnected by means of an arcuate groove portion 188. As the guide body structure 150 is moved linearly within the actuator housing relative to the yoke structure, the cam follower support elements 142 and 144 will be rotating and the cam followers 180 and 182 will be traversing one of the two linear portions of the respective cam grooves. After reaching the end of its linear travel in one direction, linear travel of the guide body structure 150 will cease. At this point, the cam follower elements 180 and 182 will enter the arcuate portions 188 of the respective cam grooves and the cam follower support elements 142 and 144 will continue to rotate about the support shaft 130. This rotation will continue until the actuator shaft 32 has properly repositioned the valve element within the valve body. The cam follower support elements will continue to rotate, allowing the cam follower elements to traverse the opposite linear portions of each of the cam grooves. As this occurs, the guide body structure 150 will again move linearly relative to the yoke structure, thereby causing the valve actuator stem 32 to move downwardly, causing the valve element to move in reseated condition within the valve body structure.

The rotational function of the valve actuator mechanism is accomplished by means of a rotational actuator stem 190 which is positioned for both linear and rotational movement within the actuator housing structure. The stem 190 is formed to define a stem and bearing receptacle 192 as shown in FIG. 3 that receives one extremity of a linear movement stem 194 having an enlarged annular flange portion 196 providing opposed support shoulders for a pair of bearing elements 198 and 200. A retainer element 202 is threadedly received within an internally threaded outer portion of the receptacle 192 and serves to maintain the bearings 198 and 200 as well as the flanged portion 196 of the linear movement stem with the stem receptacle 192. Rotation of the rotational actuator stem 190 relative to the linear movement shaft 194 is enhanced by means of bushing elements 204 and 206. The linear movement shaft 194 is formed to define an externally threaded portion 208 which extends into the power actuator 66 and is threadedly engaged by the power actuator mechanism to provide for linear movement of stem 194 as the power actuator 66 is energized. A drive nut of the power actuator may engage the externally threaded portion 208 of the stem 194 and, when rotated relative to the linear movement stem will cause stem 194 to be moved linearly with respect to the actuator housing. This linear movement also causes rotational actuator stem 190 to be moved linearly along with stem 194. The rotational actuator stem 190 is formed integrally with or nonrotatably connected to an enlarged flange portion 210 having rack support recesses 212 and 214 formed therein. A pair of rack elements 216 and 218 are provided having one extremity thereof secured within respective ones of the recesses 212 and 214 by means of screws or bolts 220. The gear teeth of the rack elements 216 and 218 are maintained in driving engagement with the pinion gears 138 and 140. Thus, upon linear movement of the rack elements 216 and 218 responsive to linear movement of the rotational actuator stem 190 and linear movement stem 194 the pinion gear elements 138 and 140 will be rotated by the interengaging gear teeth of the rack elements and pinion gears. By virtue or the nonrotatable relationship between the cam follower support elements 142 and 144 with the respective pinion gears 138 and 140, the cam follower support elements will also be rotated along with the pinion gears, thus causing cam followers 180 and 182 to traverse respective ones of the cam grooves.

As the linear movement stem 194 and the rotational actuator stem 190 are moved linearly, it is desirable to achieve rotational movement of stem 190 responsive to such linear movement. In accordance with the present invention, such rotational movement may be conveniently accomplished in the manner shown particularly in FIGS. 3, 5 and 6. As shown, the rotational actuator stem 190 is formed to define opposed rotational cam grooves 222 and 224, each having upper and lower linear portions 226 and 228 that are interconnected by means of an intermediate rotational portion 230. The upper and lower linear portions are offset by 90° on the rotational actuator stem and the intermediate rotational portion establishes a curved transition between the upper and lower rotational portions and extends at substantially 45° to both the vertical and horizontal at the central portion thereof.

The upper housing section 42 of the actuator housing is formed to define a pair of opposed bearing support bosses 232 and 234 that are each machined to define bearing apertures 236 and 238 that are surrounded by support portions 240 and 242. A pair of bearing and cam follower support elements 244 and 246 are each secured to the boss portion of the actuator housing structure by means of bolts 248, or any other suitable form of connection. As shown at the upper right hand portion of FIG. 3, each of the bearing and cam follower support elements includes an elongated body portion 248 defining a bearing and support receptacle 250 within which is received a pair of spaced bearing elements 252 and 254 that are maintained in assembly with the body structure by means of an interference fit, or by any other suitable form of retention. A retainer element, such as a snap ring, 256 may be provided to positively insure retention of the bearing elements within the receptacle structure 250. The bearing elements 252 and 254 provide rotatable support for an elongated rotatable shaft 258 having a frustoconical cam follower portion 260 extending from the housing structure 248 into received engagement within a respective one of the rotational cam grooves 222 and 224.

Figure 8:
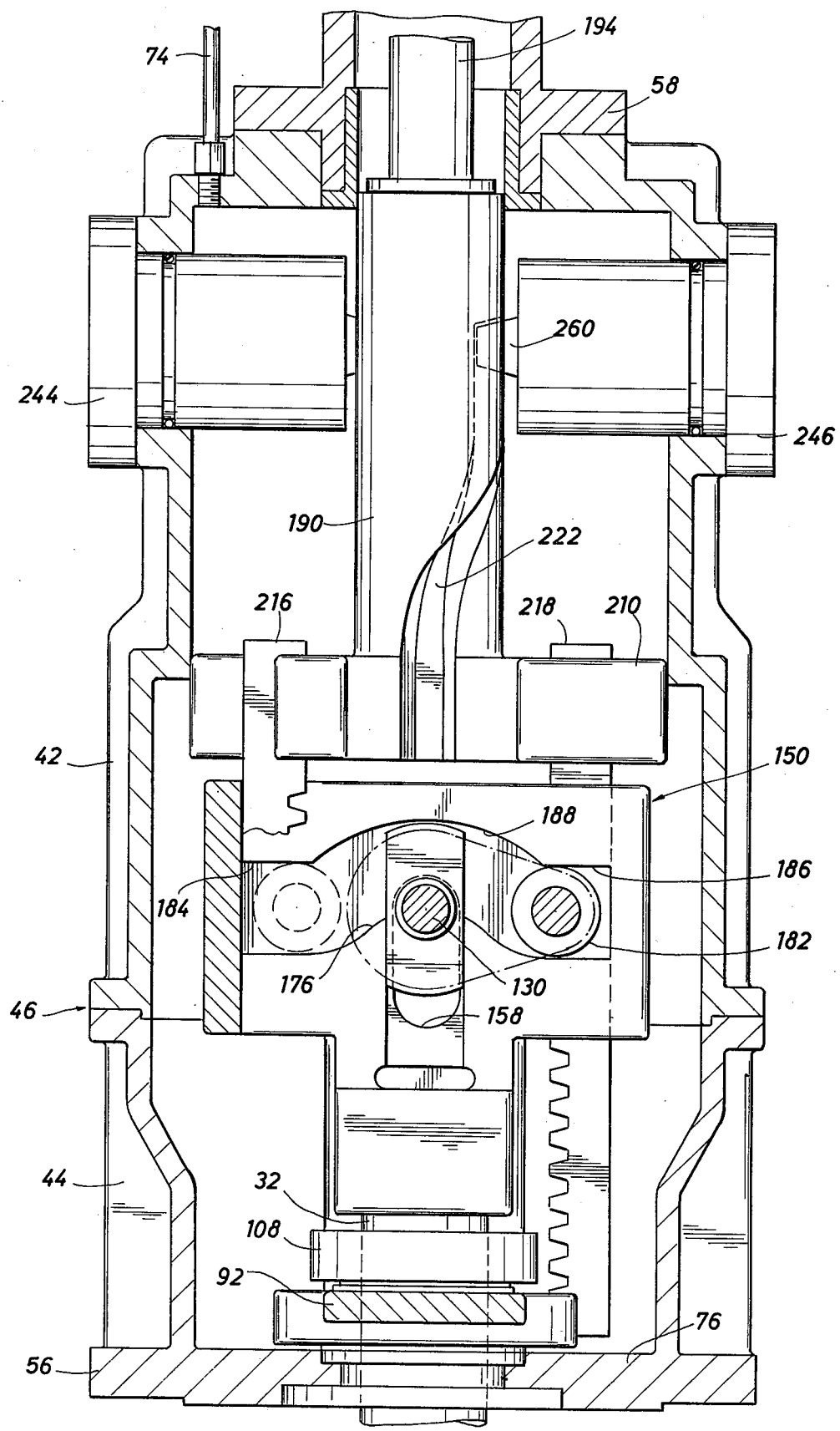
Figure 9:
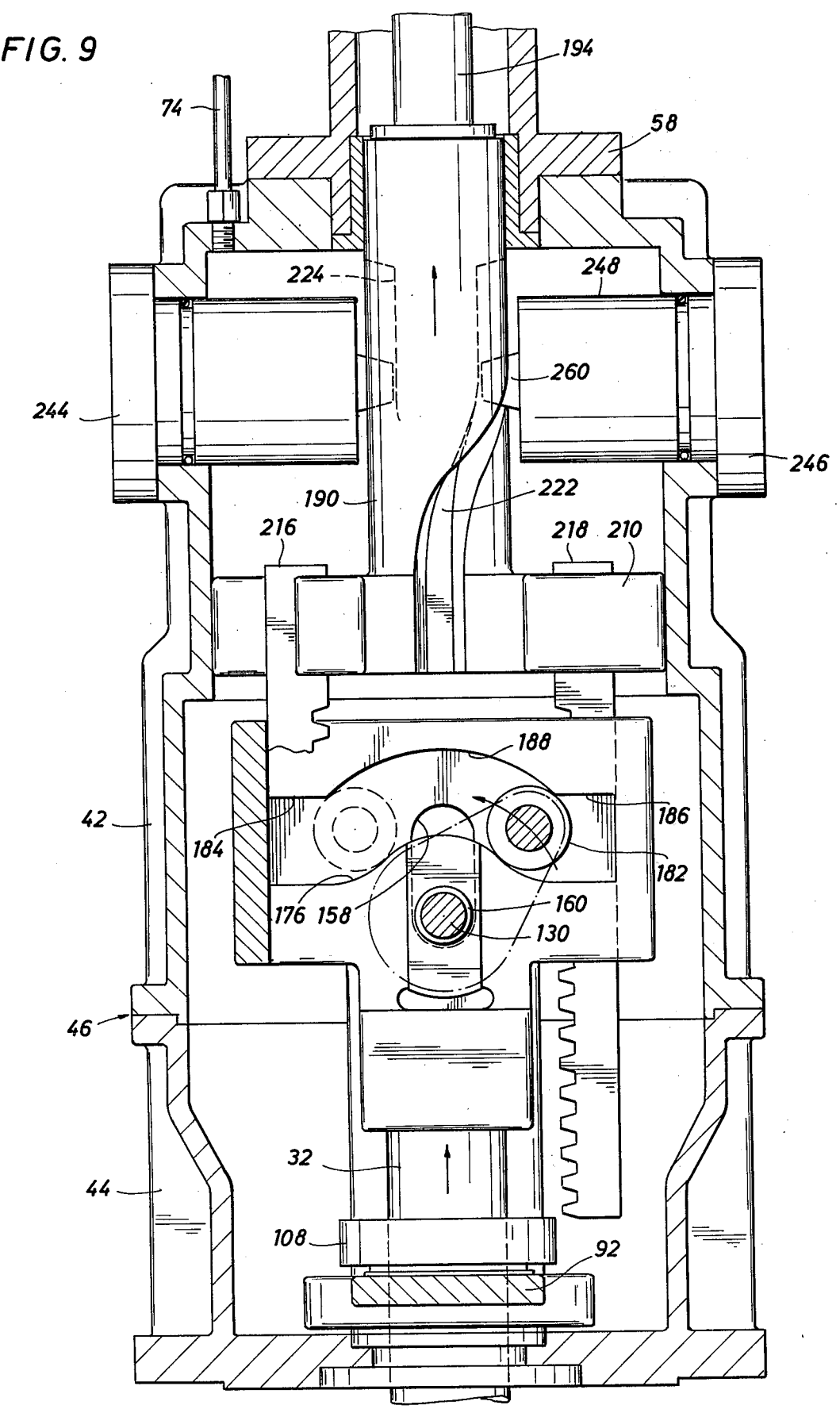

As the linear movement stem 194 moves upwardly, as shown in FIG. 3, thus imparting upward movement to the rotational actuator stem 190, the cam follower elements 260 will merely traverse the upper linear portion 266 of the respective cam grooves. Simultaneously, this upward linear movement of the rotational actuator stem 190 will be translated by way of the rack and pinion gear connection into rotational movement of the cam follower support elements 142 and 144. As this occurs, the guide body structure 150 will be moving linearly upward relative to the yoke structure and the cam follower elements 180 and 182 will be traversing the linear portions of the respective cam grooves 176 and 178. As the guide body structure reaches the limit of its upward travel as allowed by virtue of the length of the elongated slot 158, the rotational actuator stem will have moved sufficiently that the intermediate rotational portion of each of the cam grooves will be contacted by the cam follower elements 260. At this time interaction between the rotational cam grooves 230 and the cam follower elements 260 will induce 90° rotational movement of the rotational actuator stem 190 as stem 190 continues to move upwardly. This upward rotational movement acting through the rack elements 216 and 218 impart rotary movement to the guide body structure. At this time, even though the rotational actuator stem continues to move upwardly, the guide body structure will be moved only rotationally. As shown in FIG. 8, the cam follower elements are traversing the linear portions of each of the cam grooves as upward movement of the rotational actuation stem 190 is initiated. In FIG. 9, the rotational actuator stem has moved upwardly as shown by the movement arrow thus positioning the cam follower elements at the initial portion of the intermediate rotational portions of the respective cam grooves. The movement arrows also illustrate the cam follower elements being positioned at the initial portions of the respective arcuate rotational portions of the cam grooves. It should be also noted in this case that the guide body structure has been moved vertically to its maximum extent as allowed by the cooperative lost motion relationship between the elongated groove 158 and the transverse support shaft 130 and its bushing 160. Since the guide body structure can no longer move upwardly, rotational movement of the cam follower elements is accommodated by the arcuate intermediate portion of the respective cam grooves. The cam follower elements 260 acting in conjunction with the intermediate portions of the cam grooves 222 and 224 will cause rotational movement of the rotational actuator stem 190. As stem 190 rotates, the force of rotation will be translated through the rack elements to the guide body structure 150 thereby causing the guide body and the yoke element 92 to be rotated 90° so as to reposition the valve element relative to the valve body.

Continued upward movement of the linear movement stem 194 and rotational actuator stem 190 will cause the cam follower elements to enter the opposite linear portions of the respective cam grooves. Continued rotation of the cam follower elements which is induced by rotation of the cam follower support members responsive to rack and pinion gear movement will cause the guide body structure to be urged downwardly even though the rotational actuator stem 190 is moving upwardly. This downward movement of the guide body structure will cause downward movement of the valve actuator stem 34, thus causing the valve element to move downwardly within the valve body so as to move the sealing elements into sealing engagement with the sealing surfaces. Thus, it is apparent that a single upward or downward movement of the rotational actuator stem, induced by the linear movement stem will cause operational sequence movement of the valve actuator stem. The valve actuator stem will be moved upwardly to unseat the valve element, will rotate 90° to a selected position, and will then move downwardly to again reseat the valve element within the valve body.

It may be desirable to provide a nonrotatable connection between the rotational actuator stem 190 and the linear movement stem 194. In this case, an externally visible position element 262 may be connected to a shaft 264 that is supported in nonrotatable relation with the linear movement stem 194. As the rotational actuator stem 190 is rotated, the linear movement shaft 194 and the position indicator element 262 will also be rotated, thus giving a visual indication that the valve element is also rotating.

In view of the foregoing, it is apparent that the present invention is adapted to attain all of the objects and features hereinabove set forth, together with other features that are inherent from the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit and scope thereof. It is to be understood that all matters hereinabove set forth or shown in the accompanying drawings are to be interpreted as illustrative and not in any limiting sense.

What is claimed is:

1. A valve actuator mechanism for a lift-turn type plug valve having an internal valve element for movement between an opened and closed positions and incorporating a valve stem, which valve element is operated by linear unseating movement, rotational repositioning movement and linear reseating movement, said valve actuator mechanism comprising:

an actuator housing adapted for fixed assembly with said plug valve;

a first actuator stem extending from said housing and adapted to be connected in nonrotatable and linearly immovable relation with said valve stem;

a second actuator stem being movably positioned within said actuator housing and being in co-axial spaced relation with said first actuator stem;

means imparting linear and rotational movement to said second actuator stem; and movement translation means incorporating gear means and operatively interconnecting said first and second actuator stems, said movement translation means moves said valve element in one of said valve element positions and being operative during a first linear movement of said second actuator stem to impart linear movement to said first actuator stem in one direction to unseat said valve element, being operative upon combined linear and rotational movement of said second actuator stem to impart solely rotational movement to said first actuator stem and being operative upon further linear movement of said second actuator stem in said one direction to impart solely linear movement to said first actuator stem in an opposite direction to reseat the valve element.

2. A valve actuator mechanism as recited in claim 1, wherein said means for imparting linear and rotational movement to said second actuator stem comprises:

cam groove means being defined in said second actuator stem, said cam groove means defining spaced and rotationally offset linear portions interconnected by an intermediate rotational portion; and cam follower means being supported by said actuator housing and being engaged within said cam groove means, said cam follower means reacting with said intermediate rotational portion of said cam groove means to impart rotational camming movement to said second actuator stem.

3. A valve actuator mechanism as recited in claim 2, wherein said movement translation mechanism includes:

guide arm rotating means being connected to said guide arm means; and means imparting rotary movement to said guide arm rotating means in direct response to linear movement of said second actuator stem means.

4. A valve actuator mechanism as recited in claim 1, wherein said movement translation means comprises:
a yoke element supported for rotation within said actuator housing;
a guide body being connected to said yoke element and being mounted for limited linear movement relative to said yoke element;
drive means being connected to said second actuator stem, said drive means imparting rotational movement to said yoke element and guide body responsive to rotational movement of said second actuator stem;
driven means being supported by said yoke element and being operatively engaged by said drive means, said driven means imparting linear movement to said guide body responsive to movement of said drive means and driven means.

5. A valve actuator mechanism as recited in claim 4, wherein:
said guide body is formed to define cam groove means; and
said driven means includes cam follower means received within said cam groove means, said cam follower means reacting within said cam groove means to impart linear movement to said guide body means.

6. A valve actuator mechanism as recited in claim 4, wherein:
said guide body is formed to define cam groove means having spaced linear movement portions interconnected by an intermediate rotational portion; and
said driven means includes cam follower means received within said cam groove means and reacting within said cam groove means to impart linear movement to said guide body upon traversal of said linear movement portions of said cam groove means by said cam follower means, said cam follower means traversing said rotational portion of said cam groove means during rotation of said guide body and yoke while maintaining linear positioning of said guide body.

7. A valve actuator mechanism as recited in claim 1, wherein said movement translation means comprises:
a yoke element supported for rotation within said housing;
a guide body being connected to said yoke element and being mounted for limited linear movement relative to said yoke element, said guide body defining cam means;
first gear means being supported for rotation by said yoke element; cam engaging means being movable relative to said yoke element by said first gear means; and
second gear means being movable by said second actuator stem and being operatively engaged with said first gear means for movement of said cam engaging means relative to said cam means responsive to movement of said second actuator stem.

8. A valve actuator mechanism as recited in claim 7, wherein:
said first gear means being a pinion gear;
said cam engaging means being nonrotatably connected to said pinion gear; and
said second gear means being rack means extending from said second actuator stem, said rack means being in driving engagement with said pinion gear.

9. A valve actuator mechanism as recited in claim 7, wherein:
said cam engaging means is an elongated support arm;
a cam follower is supported by said drive arm and is received in engagement with said cam means, said cam follower upon being rotated by said elongated support arm reacting with said cam means to impart movement to said guide body relative to said yoke.

10. A valve actuator mechanism as recited in claim 7 wherein said cam means comprises:
at least one cam defined by said guide body and having spaced linear cam portions interconnected by an intermediate rotational cam portion;
said cam follower imparts linear movement to said guide body upon traversing said linear cam portions and traverses said intermediate rotational cam portion to maintain linear positioning of said guide body during rotation of said guide body and yoke.

11. A valve actuator mechanism as recited in claim 1 wherein said movement translation means comprises:
a yoke element supported for rotation within said actuator housing;
a guide body being nonrotatably connected to said yoke element and being linearly movable relative to said yoke element, said guide body defining cam means;
pinion gear means being rotatably supported by said yoke element;
cam engaging means being supported by said yoke means in nonrotatable relation to said pinion gear means, said cam engaging means having driving engagement with said cam means;
rack gear means being supported by said second actuator stem and having driving engagement with said pinion gear means.

12. A valve actuator mechanism as recited in claim 11, wherein said cam means comprises:
a pair of spaced linear cam portions;
an intermediate rotational cam portion interconnecting said linear cam portions;
said guide body being moved linearly upon traversal of said linear cam portions by said cam engaging means; and
linear positioning of said guide body being maintained by said cam engaging means as said cam engaging means traverses said intermediate rotational cam portion.

13. A valve actuator mechanism as recited in claim 12, wherein:
said linear cam portions are of straight configuration; and
said rotational cam portion is of arcuate configuration.

14. A valve actuator mechanism as recited in claim 12, wherein:
said linear cam portions are of straight configuration and are of substantially parallel orientation; and
said rotational cam portion is of arcuate configuration defining an arc that is coextensive with an arc of movement defined by said cam engaging means.

15. A valve actuator mechanism as recited in claim 1, wherein said movement control mechanism comprises:

guide body means defining cam groove means having spaced linear movement sections interconnected by an intermediate rotational movement section; and rotatable guide arm means being movably supported by said guide body means and having guide means positioned within said cam groove means, said guide means traversing said linear and intermediate sections of said cam groove means as said cam follower means traverses said linear and intermediate portions of said cam groove means.

16. A valve actuator mechanism for a lift-turn type plug valve having an internal valve element for movement between an opened and closed position and having a valve stem, which valve element is operated by linear unseating movement, rotational repositioning movement and linear reseating movement, said valve actuator mechanism comprising:

an actuator housing adapted for fixed assembly with said plug valve;

a first actuator stem extending from said housing and adapted to be connected in nonrotatable relation and linearly immovable relation with said valve stem;

a movement translation mechanism within said housing being connected to said first actuator stem;

a second actuator stem being supported for linear and rotational movement within said actuator housing and defining cam groove means including linear and rotational groove portions, said second actuator stem being in interconnected relation with said movement translation means;

cam follower means supported by said housing and engaging said cam groove means, said cam follower means and cam groove means moves said valve element in one of said valve element positions, said cam follower means and said cam groove means being cooperative during an operational sequence of said valve actuator to allow predetermined linear travel of said second actuator stem during an initial portion of stem movement in one direction to cause unseating of said valve element, cause 90° rotational movement of said second actuator stem during an intermediate portion of stem movement in said one direction to rotate said valve element and allow predetermined linear travel of said second actuator stem during a terminal portion of stem movement to reseat said valve element; and a movement translation mechanism incorporating gear means, said gear means translating said operational sequence movement of said second actuator stem, respectively, into an initial linear travel of said first actuator stem in said one direction, an intermediate rotational movement of said first actuator stem and a terminal linear travel of siad first actuator stem in an opposite direction during said one direction of said second actuator stem.

17. A valve actuator mechanism as recited in claim 16, wherein said movement translation mechanism comprises:

a yoke element being nonrotatably connected to said first actuator stem;

follower arm means being rotatably supported by said yoke;

guide body means defining cam groove means including at least one linear movement portion and at least one rotational movement portion, said guide body means being linearly movable relative to said yoke element;

cam follower means being provided on said follower arm means and being movably received within said cam groove means;

follower arm actuation means being provided on said follower arm means; and drive means being movable linearly and rotatably by said second actuator stem and having driving engagement with said follower arm actuation means.

18. A valve actuator mechanism as recited in claim 17, wherein:

said follower arm actuation means comprises a pinion gear; and said drive means is a rack gear element having driving relation with said pinion gear.

19. A valve actuator mechanism as recited in claim 17, wherein:

said follower arm actuation means is defined by a first gear element having a direct connection with said follower arm means;

said drive means is defined by a second gear element having geared engagement with said first gear element; and said cam follower means is defined by roller means supported by said follower arm means and received within said cam groove means.

20. A valve actuator mechanism as recited in claim 16 wherein said movement translation means comprises:

a yoke element supported for rotation within said actuator housing;

a guide body being nonrotatably connected to said yoke element and being linearly movable relative to said yoke element, said guide body defining cam means;

pinion gear means being rotatably supported by said yoke element;

cam engaging means being supported by said yoke means in nonrotatable relation to said pinion gear means, said cam engaging means having driving engagement with said cam means; and rack gear means being supported by said second actuator stem and having driving engagement with said pinion gear means.

21. A valve actuator mechanism as recited in claim 20 wherein said cam means comprises:

a pair of spaced linear cam portions;

an intermediate rotational cam portion interconnecting said linear cam portions;

said guide body being moved linearly upon traversal of said linear cam portions by said cam engaging means; and linear positioning of said guide body being maintained by said cam engaging means as said cam engaging means traverses said intermediate rotational cam portion.

22. A valve actuator mechanism as recited in claim 21, wherein:

said linear cam portions are of straight configuration; and said rotational cam portion is of arcuate configuration.

23. A valve actuator mechanism as recited in claim 21, wherein:

said linear cam portions are of straight configuration and are of substantially parallel orientation; and said rotational cam portion is of arcuate configuration defining an arc that is coextensive with an arc of movement defined by said cam engaging means.

* * * * *